US005704042A

United States Patent [19]

Hester et al.

[11] Patent Number: 5,704,042

[45] Date of Patent: Dec. 30, 1997

[54] ACCELERATED REPLICATION OF MULTIPLE COMPUTER DISPLAYS

[75] Inventors: John Hester, Oak Lawn; Krista S. Schwartz, Batavia, both of Ill.

[73] Assignee: NCR Corporation, Dayton, Ohio

[21] Appl. No.: 128,012

[22] Filed: Sep. 28, 1993

Related U.S. Application Data

[63] Continuation-in-part of Ser. No. 35,092, Mar. 19, 1993, Pat. No. 5,649,104.

[51] Int. Cl.$^6$ .......... G06F 13/38

[52] U.S. Cl. .......... 395/200.34; 395/330; 395/340

[58] Field of Search .......... 348/15; 379/202, 379/203, 204; 395/200, 329, 330, 331, 332, 200.04, 200.34

[56] References Cited

U.S. PATENT DOCUMENTS

| | | | |
|---|---|---|---|
| 4,414,621 | 11/1983 | Bown et al. | 395/329 |
| 4,516,156 | 5/1985 | Fabris et al. | 348/15 |
| 4,953,159 | 8/1990 | Hayden et al. | 370/265 |
| 5,036,315 | 7/1991 | Gurley | 345/119 |
| 5,107,443 | 4/1992 | Smith et al. | 395/331 |
| 5,136,581 | 8/1992 | Muehrcke | 370/261 |
| 5,241,625 | 8/1993 | Epard et al. | 395/502 |
| 5,432,525 | 7/1995 | Maruo et al. | 345/2 |

FOREIGN PATENT DOCUMENTS

| | | |
|---|---|---|
| 0303290 | 8/1988 | European Pat. Off. . |
| 9109378 | 12/1990 | WIPO . |

OTHER PUBLICATIONS

Electronic Learning; Connect Ideas and People With Network Software; Mar. 1990; pp. 44, 46, 48 Thomas Boudrot.
Newbridge Networks, "Inverse Multiplexing and So Much More", pp. 1–6.
Newbridge Networks, "Product Overview", pp. 7–32.
Newbridge Networks, "3500 Main Street", pp. 33–36.
Newbridge Networks, "4600 Main Street", pp. 37–41.
Newbridge Networks, "3604 Main Street", pp. 42–45.
Newbridge Networks, "3612 Main Street", pp. 46–49.
Newbridge Networks, "3624 Main Street", pp. 50–53.
Newbridge Networks, "8230 Main Street", pp. 54–57.
Newbridge Networks, "8231 Main Street", pp. 58–61.
Compression Labs, Inc. (CLI), "Eclipse Videoconferencing System, Model 8100", pp. 62–65.
Compression Labs, Inc. (CLI), "Special Report, Aug. 20, 1993", pp. 66–69.
Compression Labs, Inc. (CLI), "Compare. Why Pay 50–100 % More to Get All The Videoconferencing Features You Need?" pp. 70–71.
Compression Labs, Inc. (CLI), "Eclipse in Action", pp. 72–73.
Compression Labs, Inc. (CLI), "Rembrandt II—Radiance Videoconferencing System", pp. 74–75.
Compression Labs, Inc. (CLI), Letter entitled "Pacific Data Images Uses New Radiance Videoconferencing System to Increase Efficiency of Client Contact", p. 76.

(List continued on next page.)

*Primary Examiner*—Parshotam S. Lall
*Assistant Examiner*—Kenneth R. Coulter
*Attorney, Agent, or Firm*—Gregory A. Welte

[57] ABSTRACT

A system wherein multiple computers engage in a video conference. The invention creates a common visual image which is displayed by all computers. However, the invention does not distribute a bit map of the image to all computers. Instead, the invention distributes the commands from which the image is created.

Further, the distributed commands rely on data structures, which define parameters such as pen color, background color, line width, etc. The data structures are stored in each computer. When a data structure is changed, the invention does not immediately inform all other computers of the change, but waits until necessary.

8 Claims, 15 Drawing Sheets

Microfiche Appendix Included
(2 Microfiche, 141 Pages)

OTHER PUBLICATIONS

Compression Labs, Inc. (CLI), "Compressing Distances, Expanding Opportunities", pp. 77–88.

PicturesTel Corporation, "PictureTel Live PCS 100 Personal Visual Communications Systems" pp. 89–90.

PicturesTel Corporation, "System 4000 High Performance Dial–Up Video Conferencing", pp. 91–98.

PictureTel Corporation, "System 1000 Affordable Dial–Up Videoconferencing", pp. 99–104.

PictureTel Corporation, "PictureTel: A Chronology", pp. 105–109.

ShareVision, A subsidiary of Creative Technology, Ltd., "ShareView 300", pp. 110–111.

ShareVision, A subsidiary of Creative Technology, Ltd., "ShareView 3000" pp. 112–113.

Smart Technologies, Inc., "Smart 2000 Conferencing System", pp. 114–117.

Smart Technologies, Inc., "Q & A Questions and Answers, Smart 2000 Conferencing System", pp. 188–121.

Smart Technologies, Inc., "Training with Smart 2000" pp. 122–123.

Smart Technologies, Inc., "Smart Solutions", pp. 124–127.

Preliminary Information from ShareVision Technology Inc., 1992, PPIN0992 Rev. B.

Hoshi, Nakamura, Nakamura, "Broadband ISDN Multimedia Workstations and Group Tele–Working Systems", *Hitachi Review* vol. 40 (1991), No. 3, pp. 217–222.

Watabe, Sakata, Maeno, Fukuoka and Ohmori, "Multimedia Desktop Conferencing System: MERMAID", *NEC Research and Development* vol. 32, No. 1 pp. 158–167, Jan. 1991.

Aring & Robinson; "Support For Informal Communication in Distributed Group Work", *Wideband Communication*, pp. 864–870.

Werner B. Korte, "Multimedia BK Technology for the Support of Distributed Group Work", *Widebank Communication*, pp. 872–878.

VISIT video, Northern Telecom brochure.

Telegraphics Design Document Draft May 22, 1992.

"Desk Top Conferencing for Windows" Brochure by Fujitsu Networks Industry, Inc.

Moskowitz, Robert, "The Electronic Meeting" *Presentation Products Magazine*, Sep., 1990, pp. 24–32.

Piturro, Marlene C., "Computer Conferencing: Brainstorming Across Time and Space", *Management Review*, Aug. 1989, pp. 43–50.

"IBM Person to Person" Brochure, UltiMedia, IBM United States, Oct., 1991.

"SMART 2000 Conferencing System Brochure", SMART Technologies Inc., Calgary, AB Canada.

DeskTop Conferencing Novell® Local Area Networks Product Description, Fujitsu Networks Industry, Inc.

Streeter, April, "Videoconferencing On Any Wire", *MacWeek*, Oct. 5, 1993.

Bartino, Jim, "At These Shouting matches, No One Says A Word" *Business Week*, Jun. 11, 1990.

Andrews, Edmund L., "Plugging the Gap Between E–Mail and Video Conferencing" *New York Times*, Sunday, Jun. 23, 1991, p. 9.

Palme, Jacob, "Distributed Computer Conferencing", Elsevier Science Publishers B.V. (North–Holand), pp. 137–145.

Kelly, John N., "Technology That Supports Meetings" *Patricia Seybold's Office Computing Report*, Sep., 1988.

Wynne, Bye, "Group Support Systems and Electronic Collaboration", American Management Association *Information Management Forum*, May, 1991.

Wynne, Bye, "Groupware and Your Future", American Management Association *Information Management Forum*, Nov., 1989.

"Texaco Contributes to Group Decision Support Services Project", Campus News, *MMR*, Summer, 1990, p. 23.

Southworth, Mason, "How to Have an 'Electronic' Brainstorm", No. 1, 1990, pp. 12 and 13.

Richman, Louis S., "Software Catches The Team Spirit", Reprinted through the courtesy of the Editors of FORTUNE.

LaPlante, Alice, "Workgroup Idea Still Unclear to Users", *Info. World*, Dec. 11, 1989, vol. 11, Issue 5.

"Meeting Support An Emerging Market" pp. 69–75.

ENTENTÉ, Turnkey Electronic Classroom.

"The Year 2000: Expect Meetings to Change, Not Decline", *The 3M Meeting Management News*, vol. 3, No. 1.

LaPlant, Alice, "IBM Study: PCs Aid in Decision Process", *Info World*, vol. 11, Issue 49.

Panko, Raymond R., Presentation "Patterns of Organizational Communication".

"Brainstorming by Modem", *The New York Times*, Sunday, Mar. 24, 1991.

"Study Focuses On Use Of Rules in Meetings", *The 3M Meeting Management Institute*, vol. 3, No. 3, Dec., 1991.

Johansen, Robert "Teams for Tomorrow", Institute for the Future, pp. 521–534.

Rodden, Tom, "A Survey of CSCW Systems", *Interacting with Computers*, vol. 3, No. 3 (1991) PP. 319–353.

MODE: ANNOTATION

MODE: APPLICATION

MODE: LOCAL ANNOTATION

MODE: ANNOTATION

MODE: ANNOTATION
DRAWS BOX
CLICK 1
CLICK 2
REMOTE
REMOTES DRAW BOX ALSO
HOST
PROGRAM IS RUNNING HERE
REMOTE

MODE: APPLICATION

MODE: LOCAL ANNOTATION

MODE: LOCAL ANNOTATION (HOST)

(REMOTE)

ACCELERATED REPLICATION OF MULTIPLE COMPUTER DISPLAYS

This is a continuation-in-part of application Ser. No. 08/035,092, entitled "Remote Collaboration System," by Carleton et al., filed on Mar. 19, 1993, now U.S. Pat. No. 5,649,104 and assigned to NCR Corporation, which is hereby incorporated by reference.

CROSS-REFERENCE TO RELATED APPLICATIONS

This application is related to:

Application Ser. No. 08/035,092, now U.S. Pat. No. 5,649,104 entitled "Remote Collaboration System," by Carleton et al., filed on Mar. 19, 1993, and assigned to NCR Corporation.

Application Ser. No. 08/035,091, entitled "Remote Collaboration System," by Fitzpatrick et al., filed on Mar. 19, 1993, and assigned to NCR Corporation.

Application Ser. No. 08/033,602, entitled "Remote Collaboration System," by Pommier et al., filed on Mar. 19, 1993, and assigned to NCR Corporation.

Application Ser. No. 08/034,313, now U.S. Pat. No. 5,608,872 entitled "Remote Collaboration System," by Schwartz et al., filed on Mar. 19, 1993, and assigned to NCR Corporation.

Application Ser. No. 08/128,013, entitled "Annotation of Computer Video Displays," by Carleton et al., filed on the same data herewith, and assigned to NCR Corporation.

Application Ser. No. 08/128,018 entitled "Direct Capture of a Video Conferencing Data," by Alonso-Cedo et al., filed on the same date herewith, and assigned to NCR Corporation.

Application Ser. No. 08/128,017, now abandoned, entitled "Method and Apparatus for Display of Video Images in a Video Conferencing System," by Carleton et al., filed on the same date herewith, and assigned to NCR Corporation.

Application Ser. No. 08/128,014, now U.S. Pat. No. 5,608,426 entitled "Palette Management for Application Sharing in Collaborative Systems," by Hester, filed on the same date herewith, and assigned to NCR Corporation.

Application Ser. No. 08/128,016 entitled "Collaborative Video Conferencing System," by Schwartz et al., filed on the same date herewith, and assigned to NCR Corporation.

All the above-identified applications are incorporated by reference herein.

REFERENCE TO A MICROFICHE APPENDIX

A microfiche appendix, containing two (2) microfiche and 141 total frames is filed herewith.

BACKGROUND OF THE INVENTION

Modern telephone systems allow multiple parties at different locations to hold a conference. However, telephone conferences do not provide all of the conveniences of a face-to-face conference, where participants all meet at a common table in a meeting room.

For example, in a meeting room, participants can view an object of interest, such as a drawing or a product. Such viewing is not possible in a telephone conference.

The invention concerns systems for collaborative video conferencing, using the telephone system. The invention generates a common visual image which is distributed to several computers. The users of the computers can make annotations on the common image. When they do, the invention replicates the annotations on all displays of all computers.

The invention reduces the amount of data which is distributed in connection with generating the common visual images.

OBJECTS OF THE INVENTION

It is an object of the invention to provide an improved electronic conferencing system.

It is a further object of the invention to provide a system which allows users to remotely operate a computer program.

It is a further object of the invention to provide a system which allows multiple computers to operate a single program residing on one of the computers.

It is a further object of the invention to provide a system which allows multiple computer users to view and annotate a common display.

It is a further object of the invention to provide a video conferencing system in which the amount of data transferred among computers is reduced.

SUMMARY OF THE INVENTION

The invention makes multiple copies of a common video image by transmitting the commands used to generate the image, rather than a bitmap of the image itself. The commands require less data for transmission than the bit map.

However, the programs running on the computers require more data to draw the image than contained in the commands themselves. Additional data is supplied by data structures contained in the computers. These data structures are sometimes called "device contexts" or "objects," and specify such parameters as line color and line width. The data structures can be changed by users, and, if a user does nothing, the data structures maintain default values.

When a data structure is changed, the invention does not inform all other computers of the change immediately, but waits until the other computers need to know about the change.

DESCRIPTION OF A PREFERRED EMBODIMENT

Overview

Figure 1:
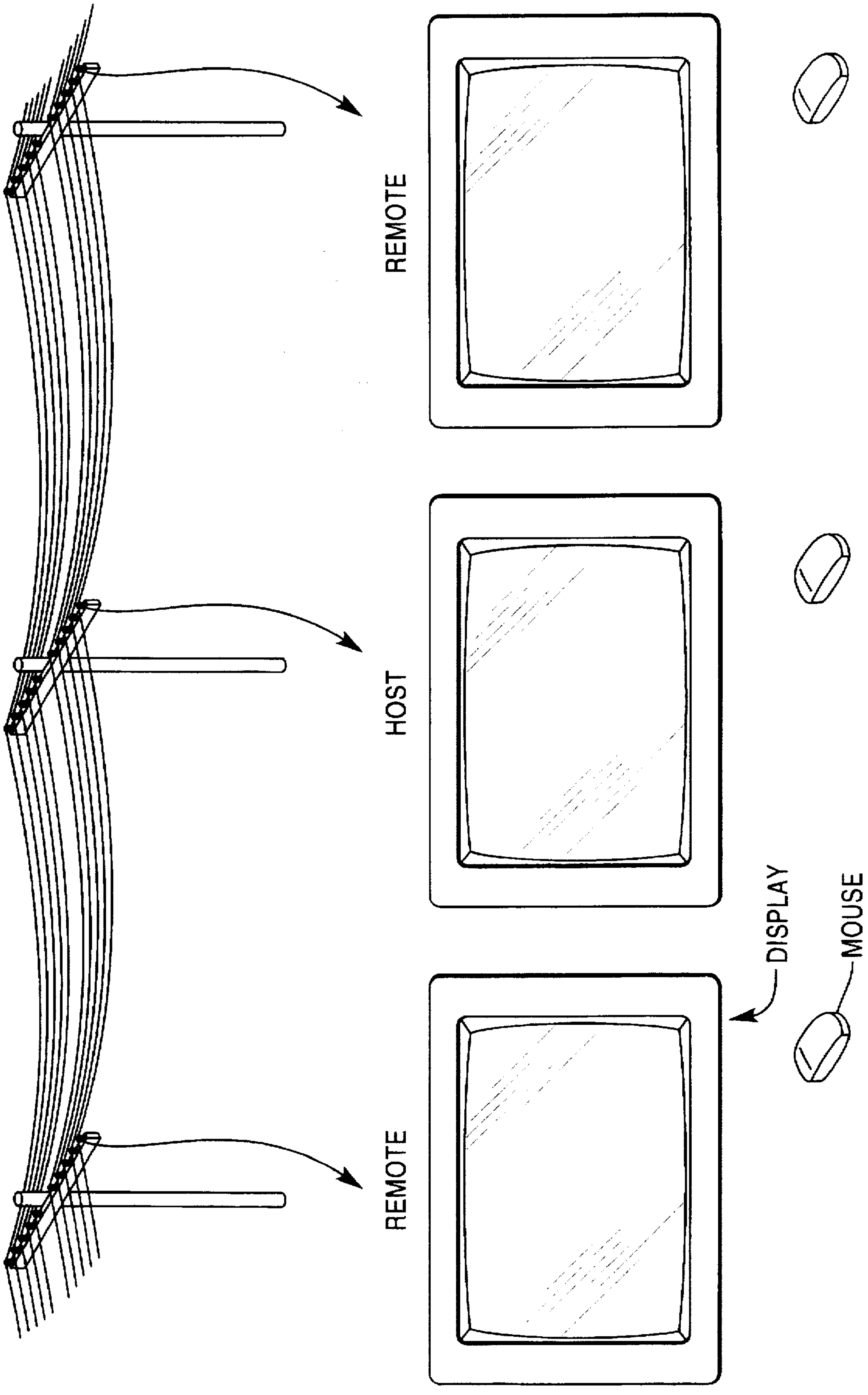
FIG. 1 illustrates three computers, connected by telephone lines.

FIG. 1 shows three computers connected by telephone links. Each computer runs a message-driven, multi-tasking, Graphical User Interface (GUI), such as that sold under the name Windows, available from Microsoft Corporation, located in Redmond, Wash. Such GUIs are also called operating environments.

The user of a GUI interacts with a program by way of windows. The invention replicates selected windows, rather than the entire display, at the remote computers. This selective replication allows users to maintain private areas on their displays, which are not shared.

Each computer also runs software developed by the inventors. In addition, one computer (the Host) runs an Application program. (It is possible for the Host to run both programs because of the multi-tasking capabilities of the GUI.)

The invention has four basic modes of operation:

1. Application Mode

Figure 2:
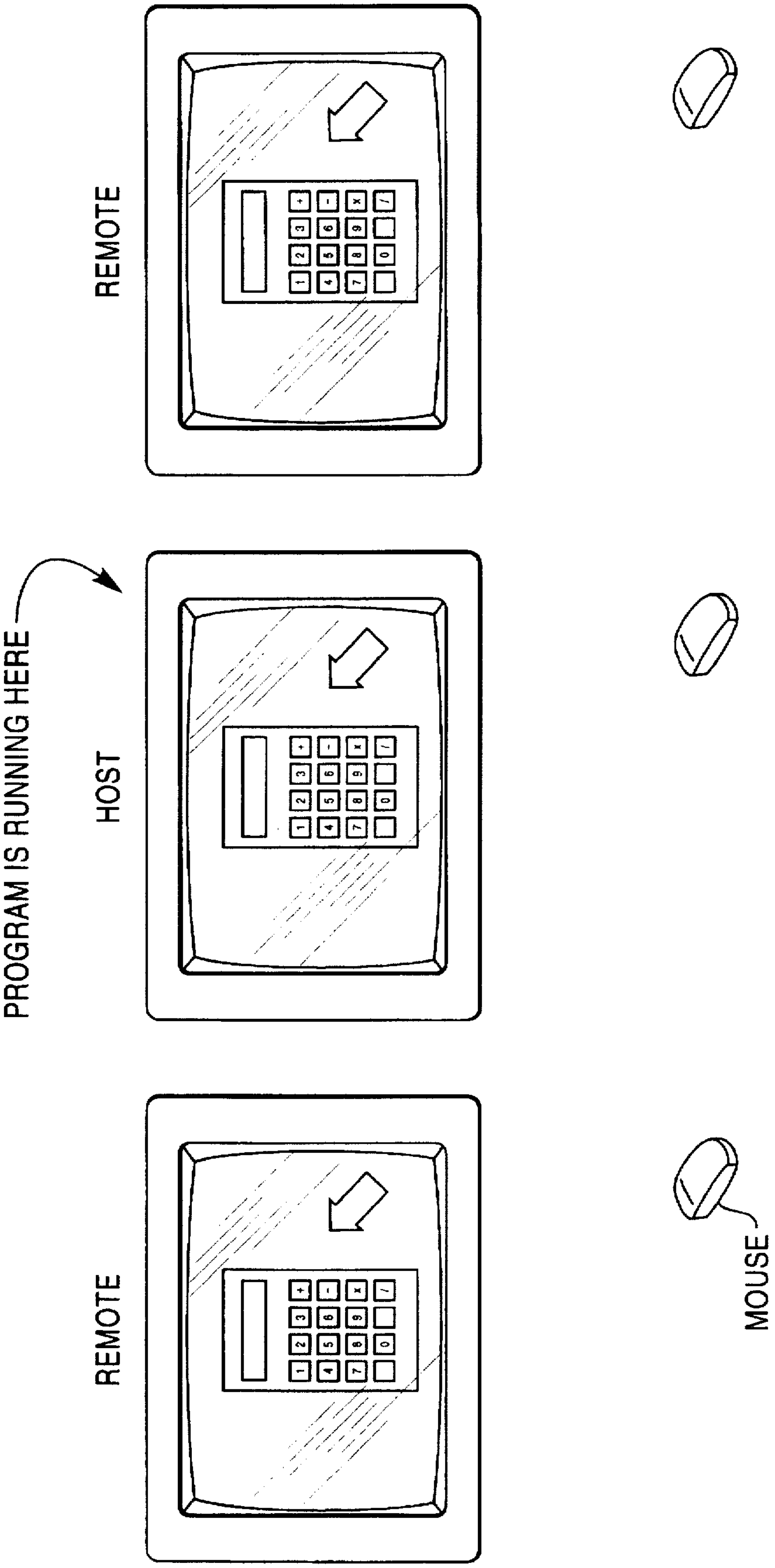
FIG. 2 initiates an example, which will be elaborated in FIGS. 3, 4, 5, 6, 7, 8, 9, 10, 11, 12, 13, and 14. In the example, a calculator program is operated, and annotated, by various parties.

Any user of any of the three computers in FIG. 1 can issue commands to the Application program. For example, assume the Application program is one which simulates a hand-held calculator. The initial situation is shown in FIG. 2, where each computer display shows the calculator. Assume that the following events occur:

The user of the Host presses the "3" button on the calculator (either by keyboard input, or mouse input, depending upon the design of the calculator program). In response, each calculator, in its display area, shows a "3".

The user of one Remote presses "+".

The user of the other Remote presses "6".

The user of the Host presses "=".

At this point, all calculators will display "9", which is the sum of 3 and 6. The users collectively operated the calculator program, and the display of each shows the result.

The calculator program does not care which users pressed the buttons, nor whether some users pressed no buttons, provided a legal sequence of buttons was received. (It is assumed that the users are cooperative, and that no users try to sabotage operation of the calculator.)

2. Annotation Mode

Any user can draw on the user's own, local, display, using drawing tools similar to those found in a "paint" program. The user can draw boxes, circles, arcs, text, ellipses, and so on. The user can also erase items on the display.

The invention can replicate the user's annotations on all other displays, so that all users view similar displays. However, the displays could be different, because of the following factors:

(A) Different display monitors have different properties, such as resolution and color capability.

(B) Different display protocols (EGA, VGA, etc.) represent graphics images differently, and have different color capabilities.

(C) Different GUIs, or different versions of the same GUI, may have different display conventions. Different computers in FIG. 1 could run the different GUIs.

(D) Some users have changed the size of the window in which their calculator is displayed, causing a deviation in scaling.

These differences can cause differences in the appearance of the displayed images, relative to each other, but the basic content of all displays should be the same. To accommodate size differences, the invention draws to different scales as appropriate.

3. Local Annotation Mode

A user can annotate the local display, but the annotations are kept private, and no other user can see the annotations.

4. View Mode

No users can annotate, nor can they issue commands. However, an action resembling annotation can be taken. Users can move their cursors, and others will see the movement, allowing remote pointing. View Mode is useful in one embodiment, wherein, for example, Annotate Mode is in force, but a specific user's mode is designated as View. In this embodiment, all users can annotate, but the "View" user can only watch, and cannot annotate.

Explanation of Individual Modes

FIGS. 3–14 will illustrate the different modes, by way of example, using the calculator program.

FIG. 3

Host Runs Application Program
Mode is "Annotation"
User Input is at Host Computer
User Attempts to Operate Calculator Assume that the user of the host computer attempts to add two numbers, using the calculator. Attempted entry of the first number will be considered.

Figure 3:
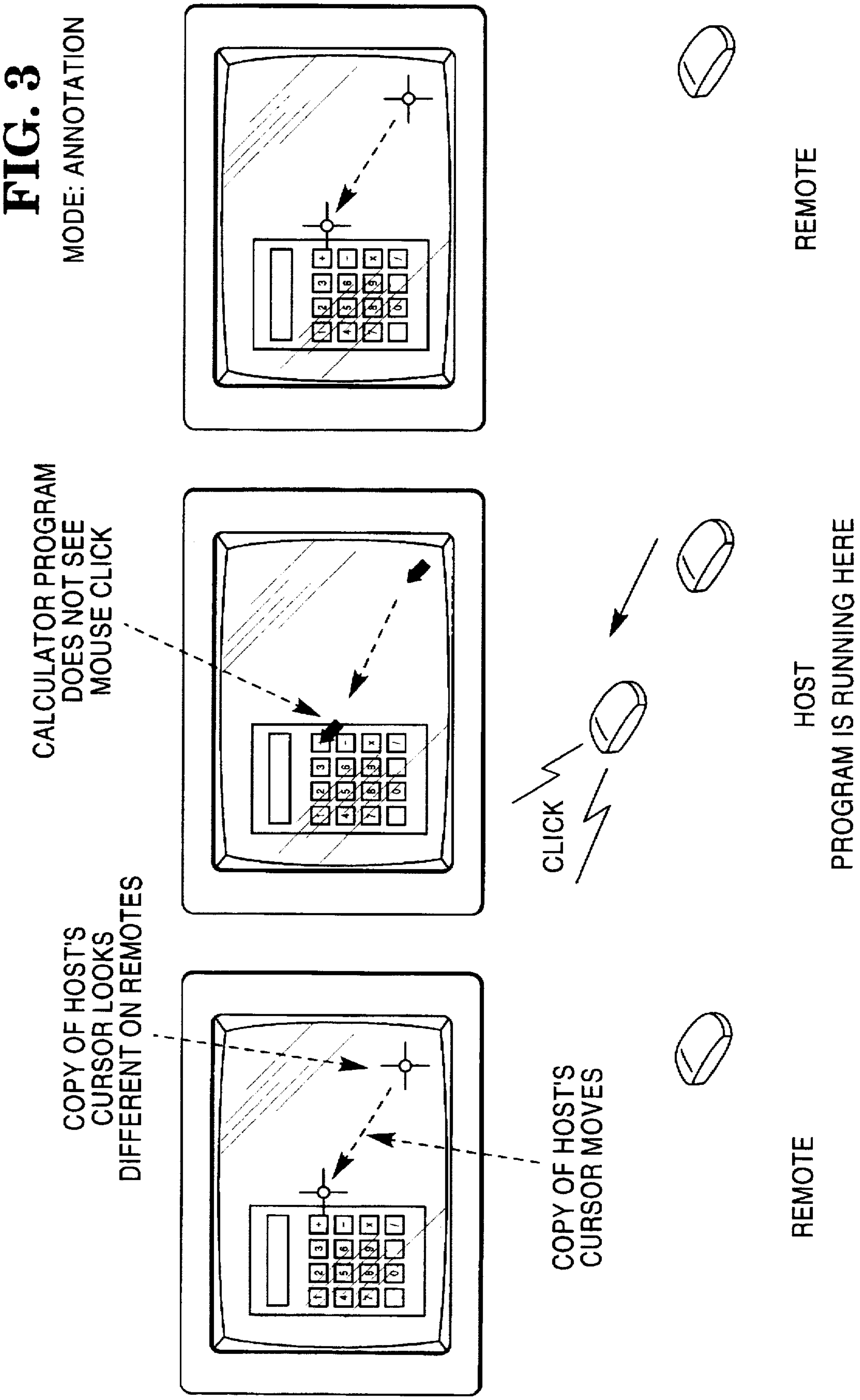
FIG. 3 illustrates how the invention responds when a host user attempts to operate the calculator, when the invention is in Annotation mode.
Figure 4:
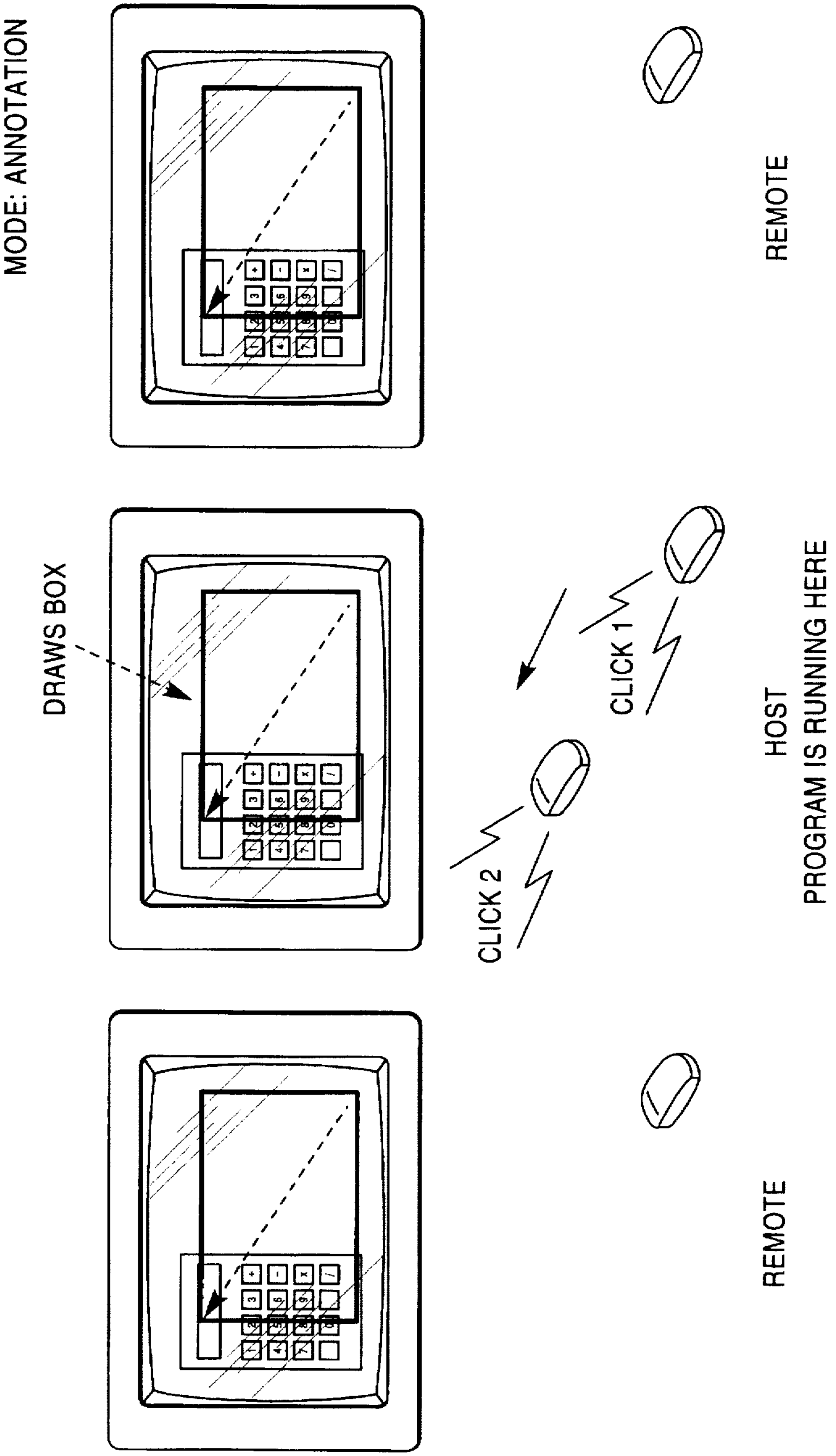
FIG. 4 illustrates how the invention responds when a host user attempts to annotate the calculator, when the invention is in Annotation mode.
Figure 5:
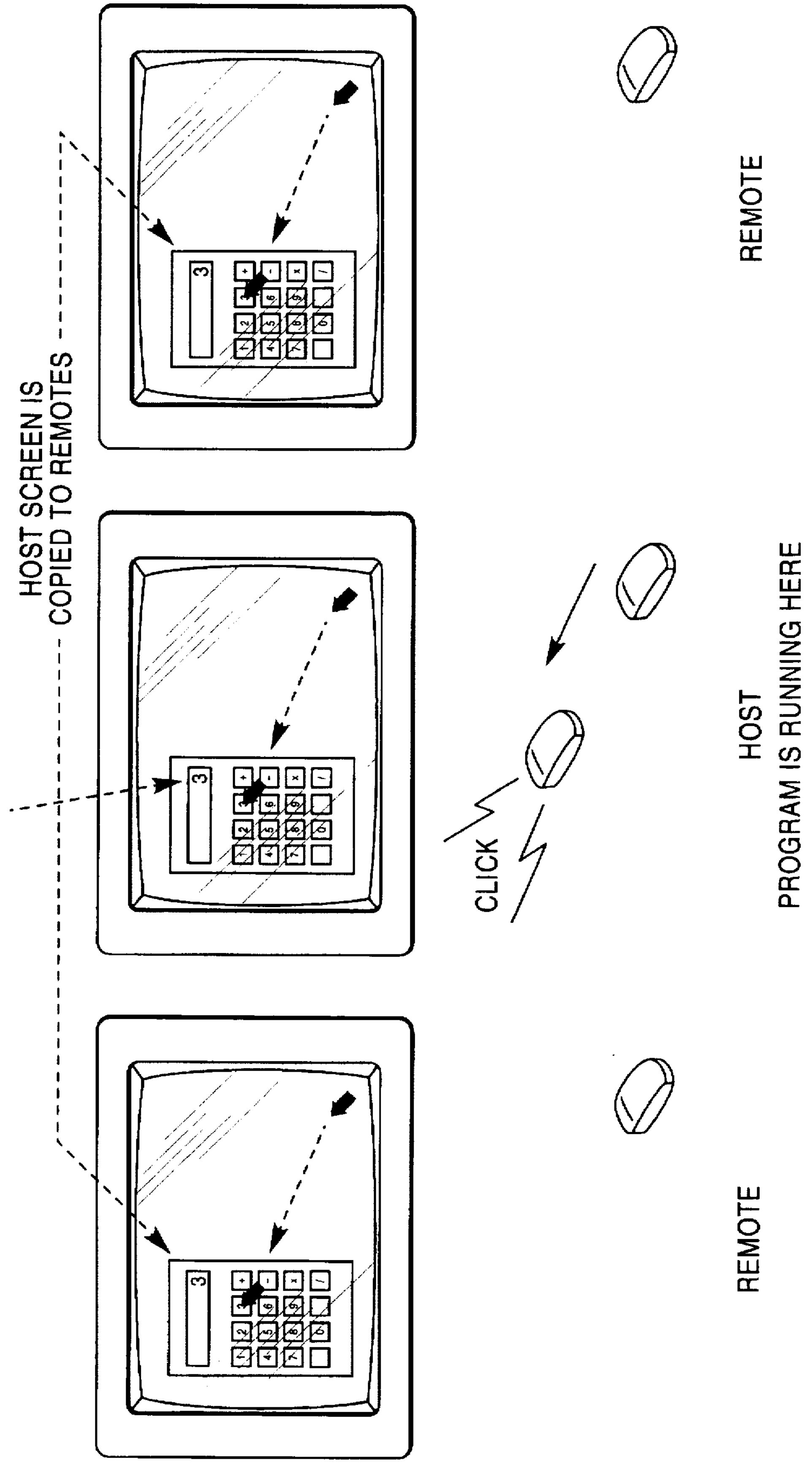
FIG. 5 illustrates how the invention responds when a host user attempts to operate the calculator, when the invention is in Application mode.
Figure 6:
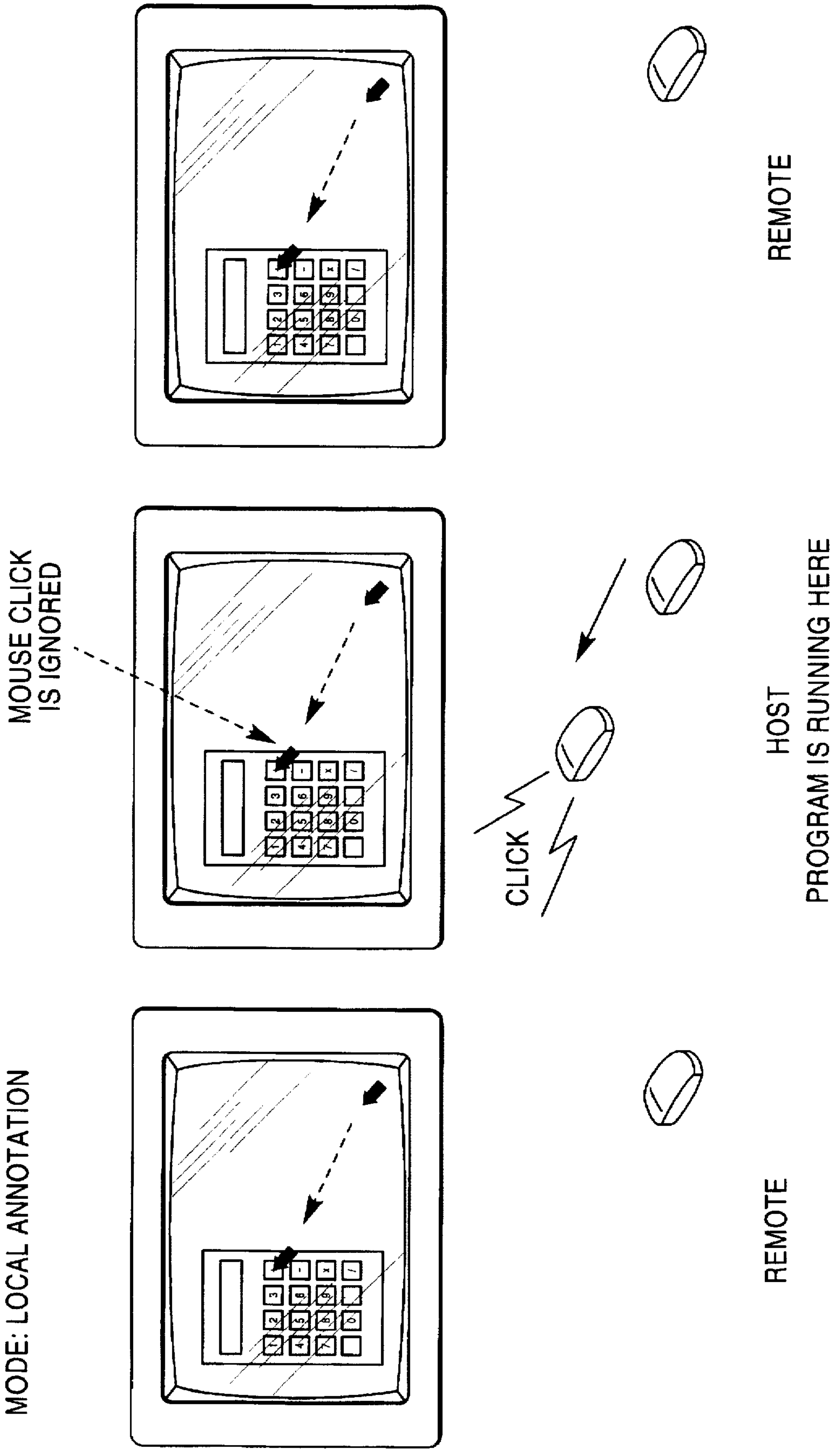
FIG. 6 illustrates how the invention responds when a host user attempts to operate the calculator, when the invention is in Local Annotation mode.

The user, located at the Host, moves the Host's cursor over a key of the calculator, as shown in FIG. 3, and tries to depress the key, by clicking the mouse. However, the mouse click does not reach the Application program, because the invention blocks it. The Application program does not respond, because it receives no mouse click.

That is, in more detail, the GUI detects the mouse movement, and causes "mouse messages" to be generated. The GUI places the mouse messages into a queue, where they await processing. INPUT ROUTER in FIG. 15 reads these messages. Because "Annotation Mode" is currently in force, INPUT ROUTER directs the messages to the ANNOTATION block. APPLICATION does not receive the messages, and thus does not respond. The mouse click is ignored.

ANNOTATION's Response

ANNOTATION can be configured to respond in two (or more) ways to the mouse messages. In one configuration, ANNOTATION requires the mouse to initially select an ANNOTATION TOOL. If no selection is done, ANNOTATION ignores mouse messages.

Selection is done by clicking the mouse over an image of the tool, as is commonly done in "paint" programs. ANNOTATION recognizes this tool selection, and then treats subsequent mouse clicks as data for drawing with the selected tool. For example, if a rectangle tool were selected, the next two mouse clicks would define the diagonal corners of the rectangle. (FIG. 4, later discussed, illustrates drawing a rectangle.)

Under the second configuration, a default tool, such as a pen, is automatically selected when in Annotation Mode. In this configuration, when the user tries to depress a calculator button (by clicking on it), the user (unintentionally) initiates drawing of a line, using the pen. When the user recognizes this, the user can terminate drawing of the line, in any of several known ways.

Therefore, in Annotation Mode, the invention either (a) responds to mouse input by initiating a default annotation, or (b) ignores the mouse input, because an annotation tool was not selected. Keyboard input from the user is treated the same way. Of course, other responses by ANNOTATION can be designed.

Tracking of Cursors

Each display shows a cursor whose position is controlled by the associated mouse. The invention replicates each cursor on all displays. Thus, in FIG. 3, with three mouses, there are three cursors on each display (only one is shown for simplicity).

Consequently, when one user moves a mouse, the corresponding cursor moves on all displays.

In general, the three cursors are distinguishable: each cursor identifies its owner, as by color, shape, inclusion of a label, or the like.

FIG. 4

Host Runs Application Program
Mode is "Annotation"
User Input is at Host Computer
User Attempts to Draw a Box over the Calculator This situation is quite similar to that of FIG. 3, except that, now, the user intends to draw an annotation, instead of intending to press a button, as in FIG. 3.

Assume that the user of the host computer draws a box over the calculator. (The box is shown overly large, for emphasis. It is preferred that the box not extend beyond the calculator itself.) The invention replicates the box on the remote computers. (The box is drawn using annotation tools, which are not shown.)

Figures 15, 15A:
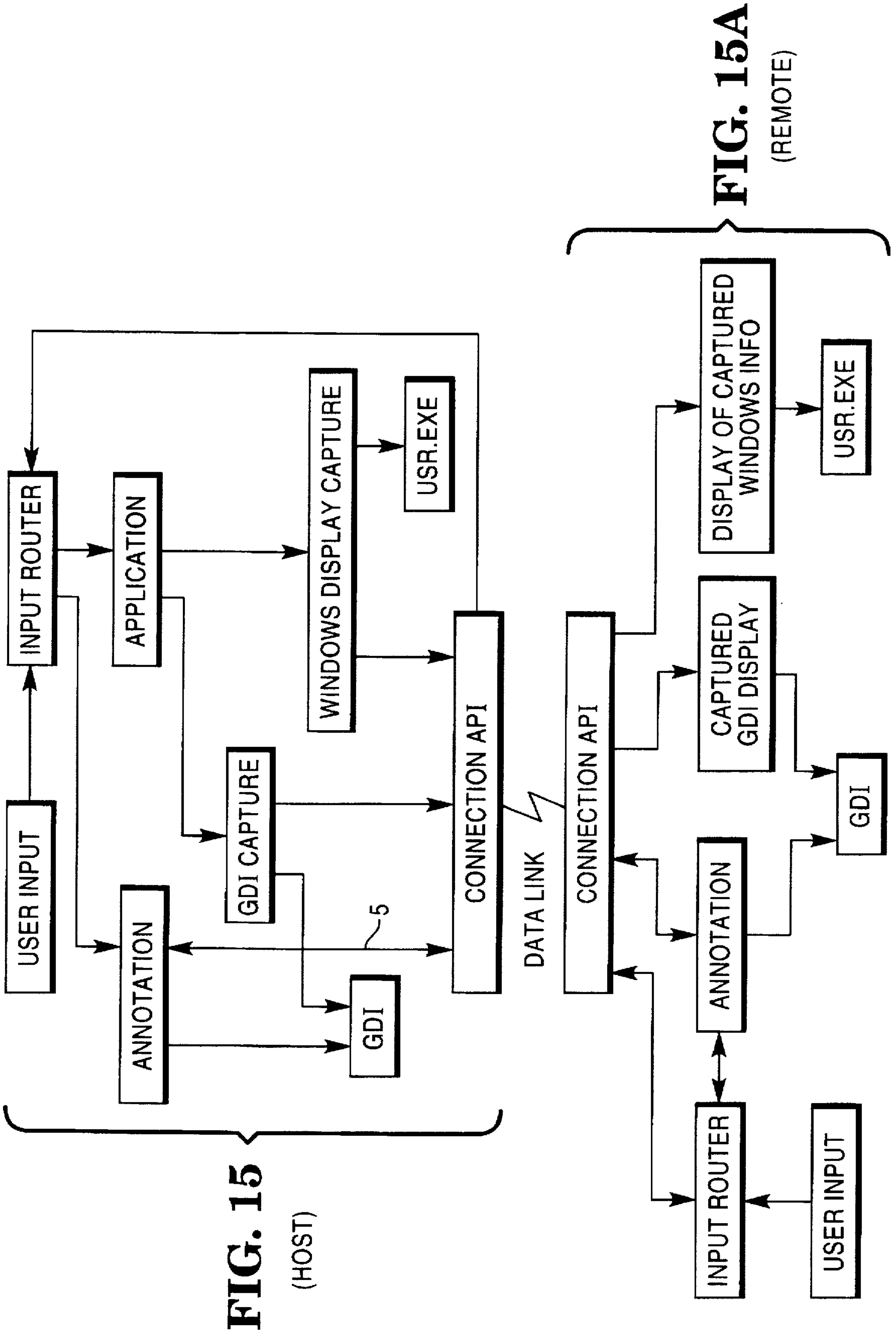
FIGS. 15 and 15A illustrate logic flow used by the invention.

In terms of FIG. 15, INPUT ROUTER directs the logic flow to ANNOTATION. ANNOTATION calls the proper GDI functions to draw the box. Also, ANNOTATION sends "annotation messages" to CONNECTION API, which delivers the annotation messages to the Remotes.

ANNOTATION in FIG. 15A receives the annotation messages. This ANNOTATION block represents the logic executed at each remote computer. This ANNOTATION calls the proper GDI functions, via the block GDI.

"GDI" is an acronym for Graphical Device Interface. "GDI functions" are small programs, contained in a larger program of the GUI called GDI.EXE. A GDI function, when called, draws a specific graphic image, such as a circle, box, or text, based on subsequent input from the user. Other GDI functions perform other tasks, such as selecting pen widths.

GDI.EXE is a commercially available product. Technical details concerning GDI.EXE are contained in "Windows Software Development Kit," available from Microsoft Corporation, and in Programming Windows 3.1 by Charles Petzold (Microsoft Press, Redmond, Wash., 1992, ISBN 1-55615-395-3).

FIG. 5

Host Runs Application Program
Mode is "Application"
User Input is at Host Computer
User Attempts to Use Calculator The user of the Host moves the cursor over the calculator key "3" and clicks the mouse. The GUI generates a mouse message and places in into the queue. The invention reads the mouse message, and passes the message to the Application program (ie, the calculator program), which responds by (1) showing that the key "3" is depressed and (2) drawing the numeral "3" in the calculator's display, using GDI calls. The Application program also records the fact that the user enters a "3," for its own internal operations.

The invention also intercepts the GDI calls made by the Application program in drawing the "3" in the calculator, and in drawing the depressed "3" button. The invention notifies the other computers of the GDI calls. The other computers replicate the Host display, by executing the same GDI functions. Greater detail concerning this GDI interception is given later, in the section entitled "General Considerations."

Thus, all users simultaneously see the user of the Host operate the calculator. (The action is not exactly simultaneous, because extremely short delays are involved. However, a human probably could not detect the delays if the Host and the Remote were operating side-by-side.)

In terms of FIG. 15, the INPUT ROUTER recognizes that the mouse messages should be directed to the Application program, and directs the logic flow to APPLICATION (ie, the calculator program). APPLICATION (1) draws a depressed "3" key and (2) writes the numeral "3" in the calculator's display, by calling appropriate GDI functions.

However, the invention, via GDI CAPTURE in FIG. 15, captures the Application program's GDI calls, before they are executed. The invention does two things with the captured calls. One, it notifies the other computers of these calls, via the block CONNECTION API. This action leads to block CAPTURED GDI DISPLAY in FIG. 15A, which causes each Remote to execute the same GDI functions, as indicated by block GDI.

Two, the invention allows the GDI functions, called by the Application program, to be executed at the host, via the block GDI in FIG. 15.

Therefore, the invention captures GDI function calls made by the Application Program. The invention notifies the Remote computers of the captured calls, so that the Remotes can duplicate them. The invention allows the captured calls to be executed as intended on the Host.

FIG. 6

Host Runs Application Program
Mode is "Local Annotation"
User Input is at Host Computer
User Attempts to Operate Calculator Assume that in Annotation Mode, there is no default annotation tool given to the user. Under this assumption, if the user moves the cursor to a calculator button, and tries to "press" the button, the INPUT ROUTER in FIG. 15 passes the mouse message to the ANNOTATION block. Since the mouse click is not part of a valid annotation input sequence (no tool was selected), ANNOTATION draws nothing.

Further, the Remote computers do not show the movement of the cursor corresponding to the Host computer's mouse, as indicated, because line 5 in FIG. 15 does not send Annotation Messages to the other computers when Local Annotation is in force.

Further still, the calculator button is not re-drawn as a depressed button on the Host display, in response to the attempt to press it, because APPLICATION did not receive the mouse message. APPLICATION is responsible for drawing depressed calculator buttons.

If a default annotation is assigned to the user in Local Annotation Mode, the user's mouse click would initiate drawing by that tool. When the user realized the mistake, the user would terminate the drawing, in a known manner.

FIG. 7

Host Runs Application Program
Mode is "Local Annotation"
User Input is at Host Computer
User Attempts to Annotate Calculator Under these conditions, the INPUT ROUTER in FIG. 15 recognizes a valid attempt to perform annotation, as by drawing a box. The INPUT ROUTER directs the logic flow to the ANNOTATION block, which calls the proper GDI functions for drawing the annotation, namely, a box, as shown in FIG. 7.

Figure 7:
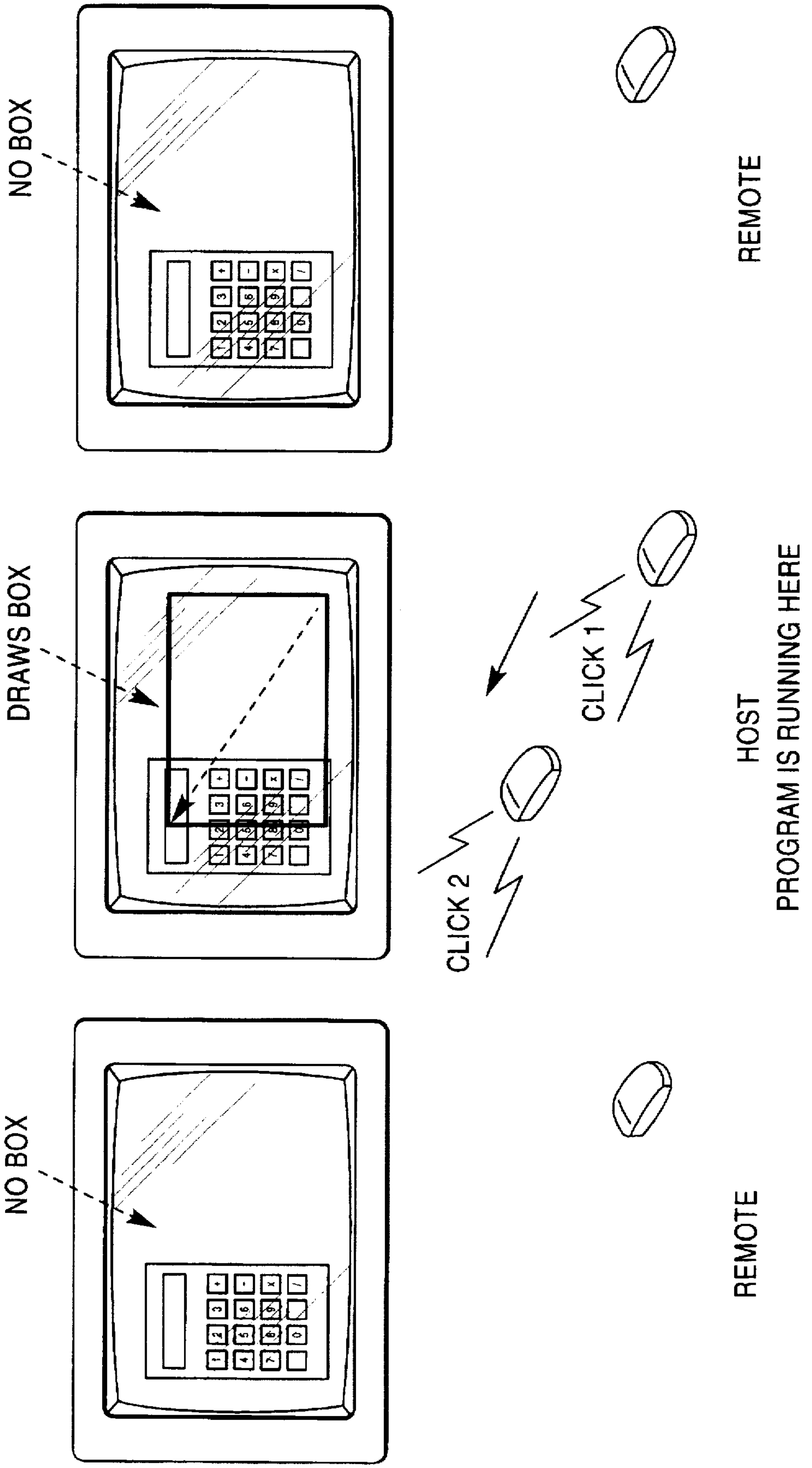
FIG. 7 illustrates how the invention responds when a host user attempts to annotate the calculator, when the invention is in Local Annotation mode.

However, because the annotation is local, no boxes are drawn on remote computers, as indicated in FIG. 7. No data is sent along data path 5 in FIG. 15.

FIG. 8

Figure 8:
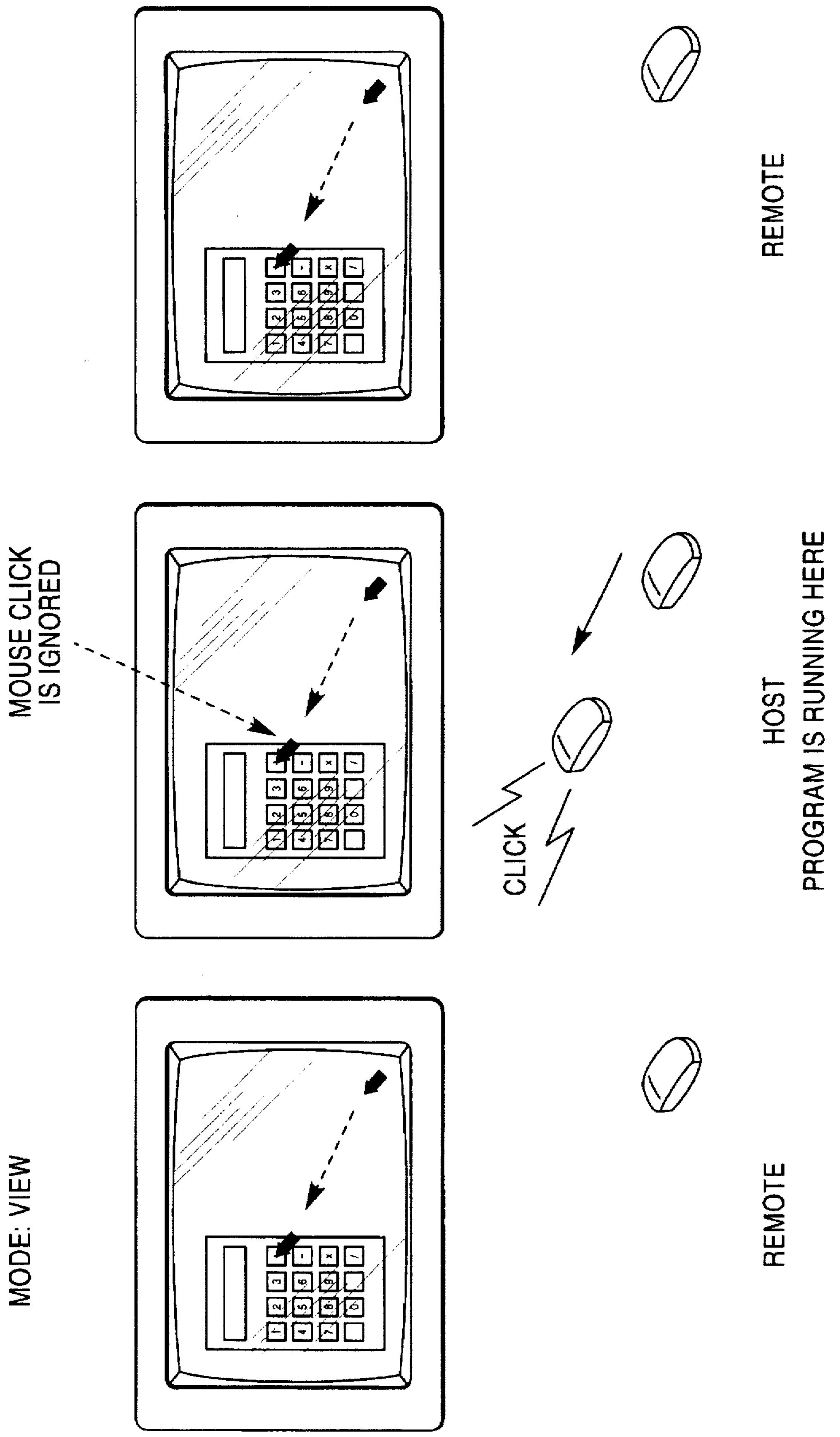
FIG. 8 illustrates how the invention responds to a host user when in View mode.
Figure 9:
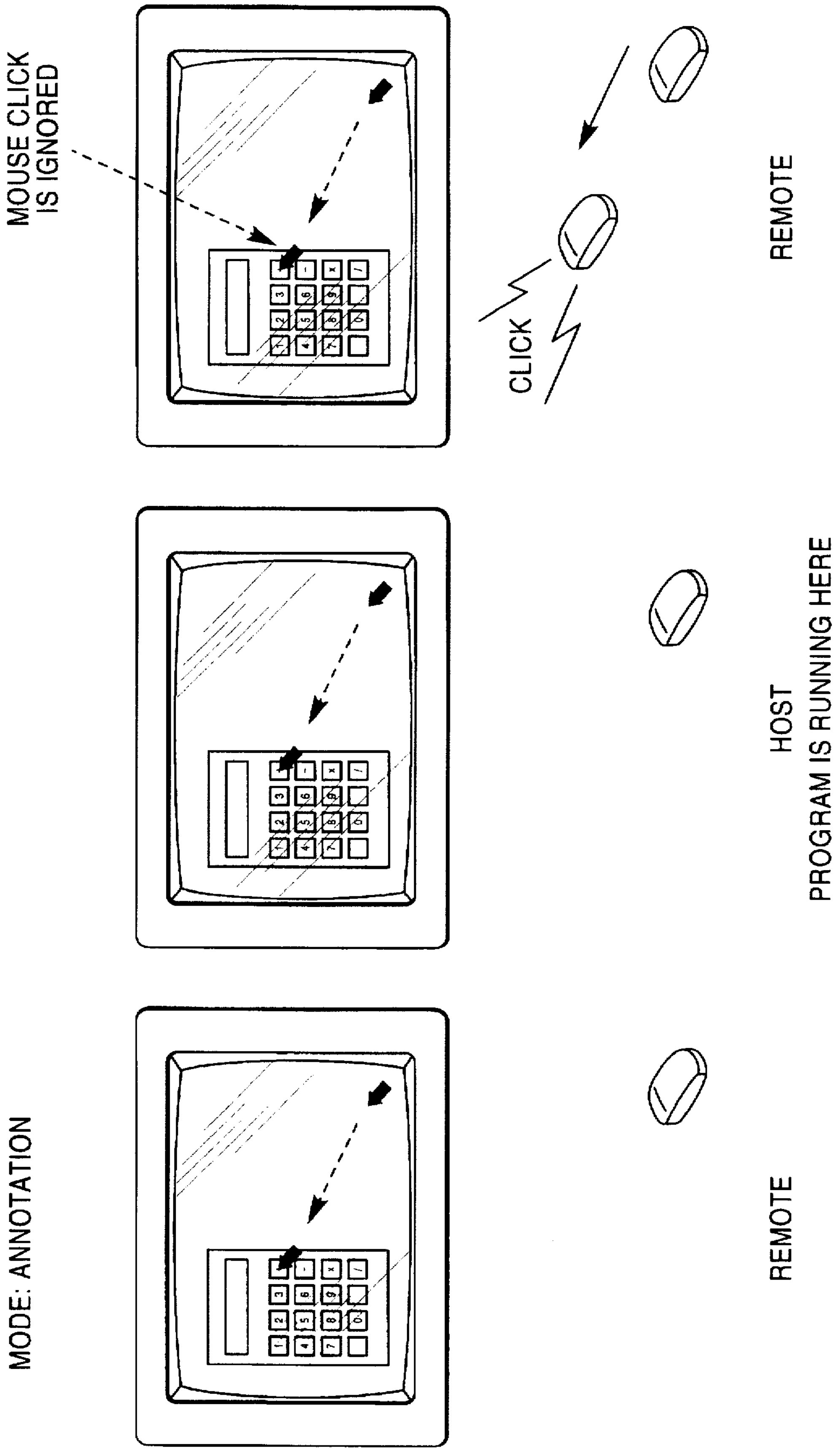
FIG. 9 illustrates how the invention responds when a remote user attempts to operate the calculator, when the invention is in Annotation mode.
Figure 10:
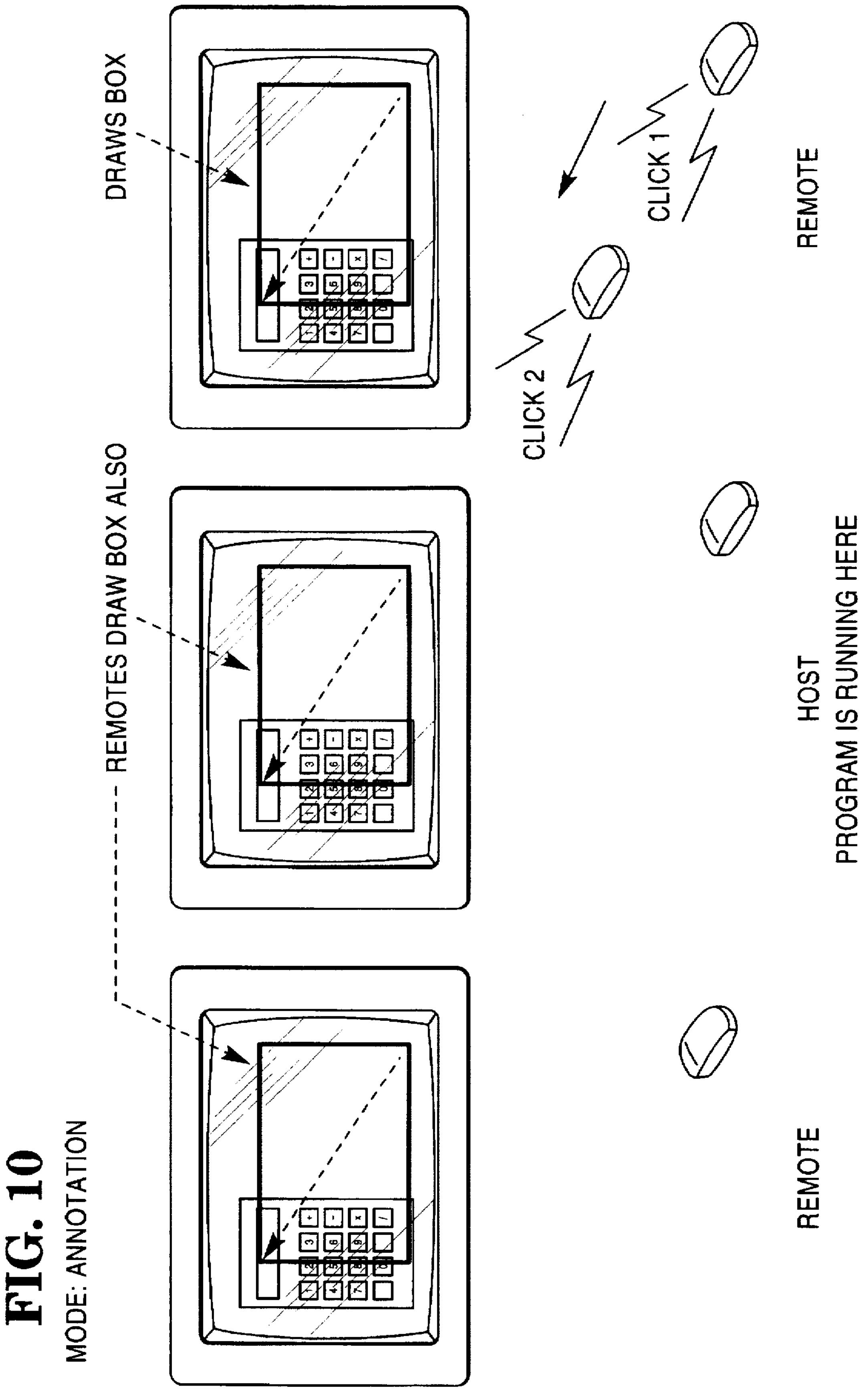
FIG. 10 illustrates how the invention responds when a remote user attempts to annotate the calculator, when the invention is in Annotation mode.
Figure 11:
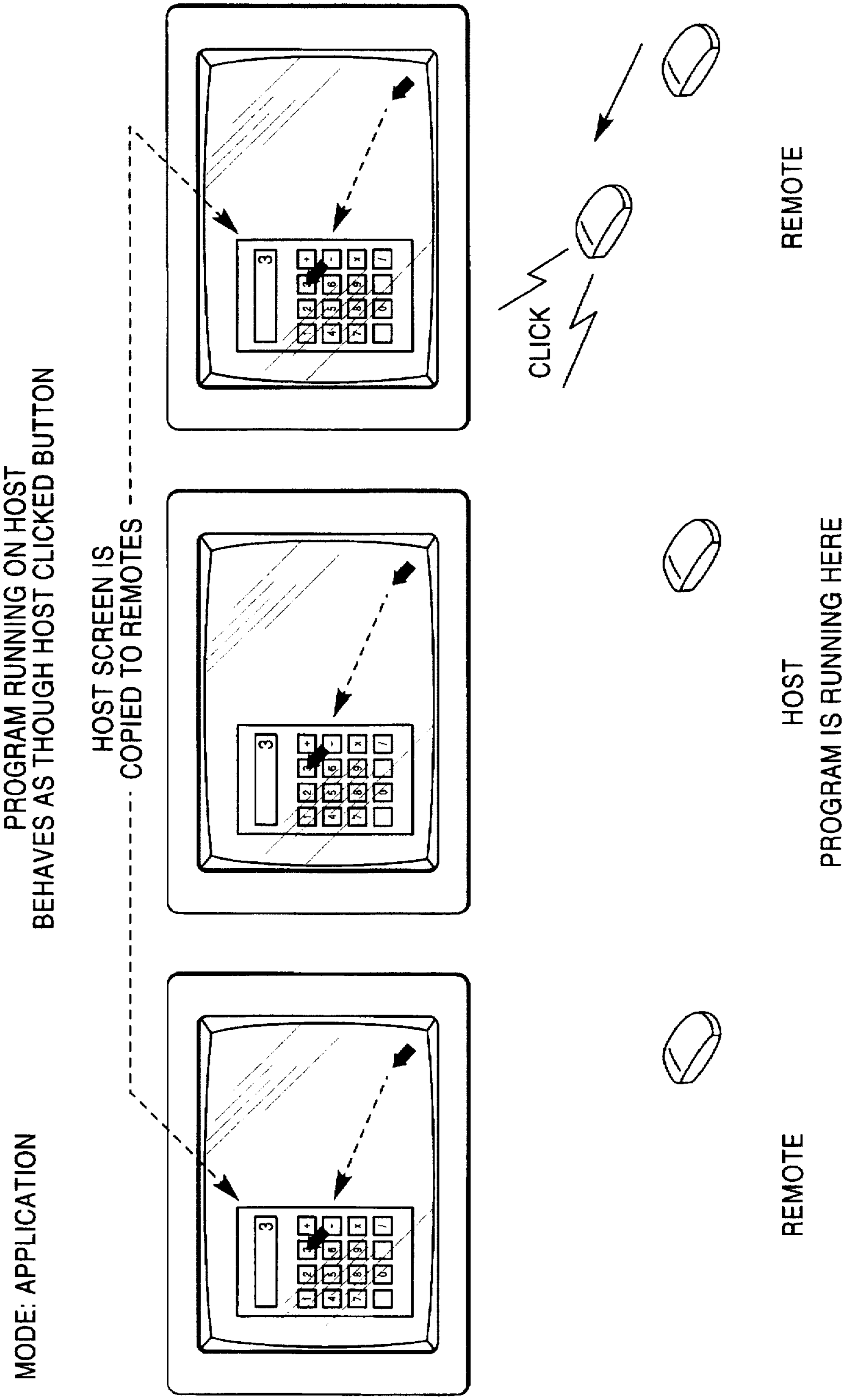
FIG. 11 illustrates how the invention responds when a remote user attempts to operate the calculator, when the invention is in Application mode.
Figure 12:
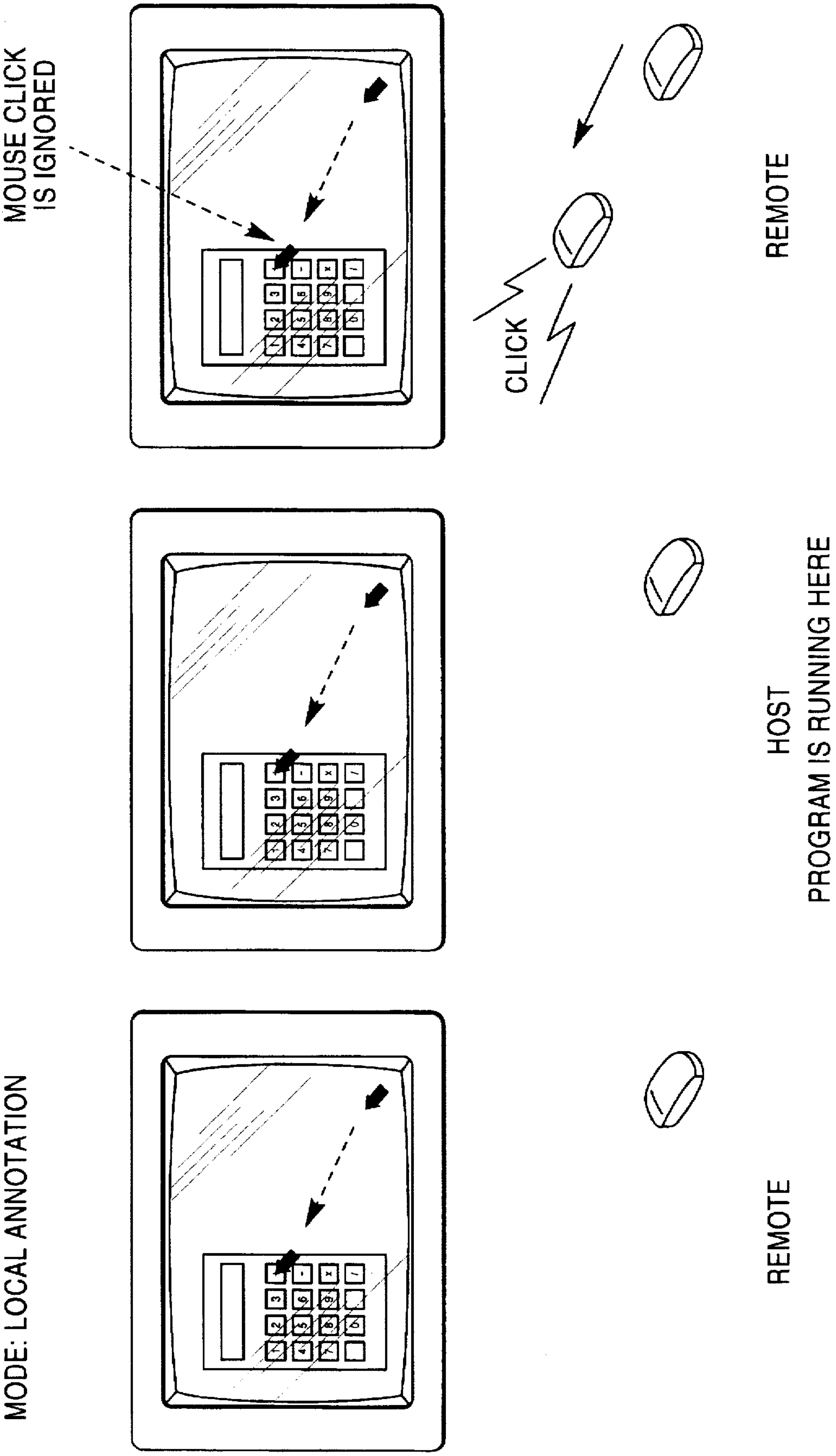
FIG. 12 illustrates how the invention responds when a remote user attempts to operate the calculator, when the invention is in Local Annotation mode.
Figure 13:
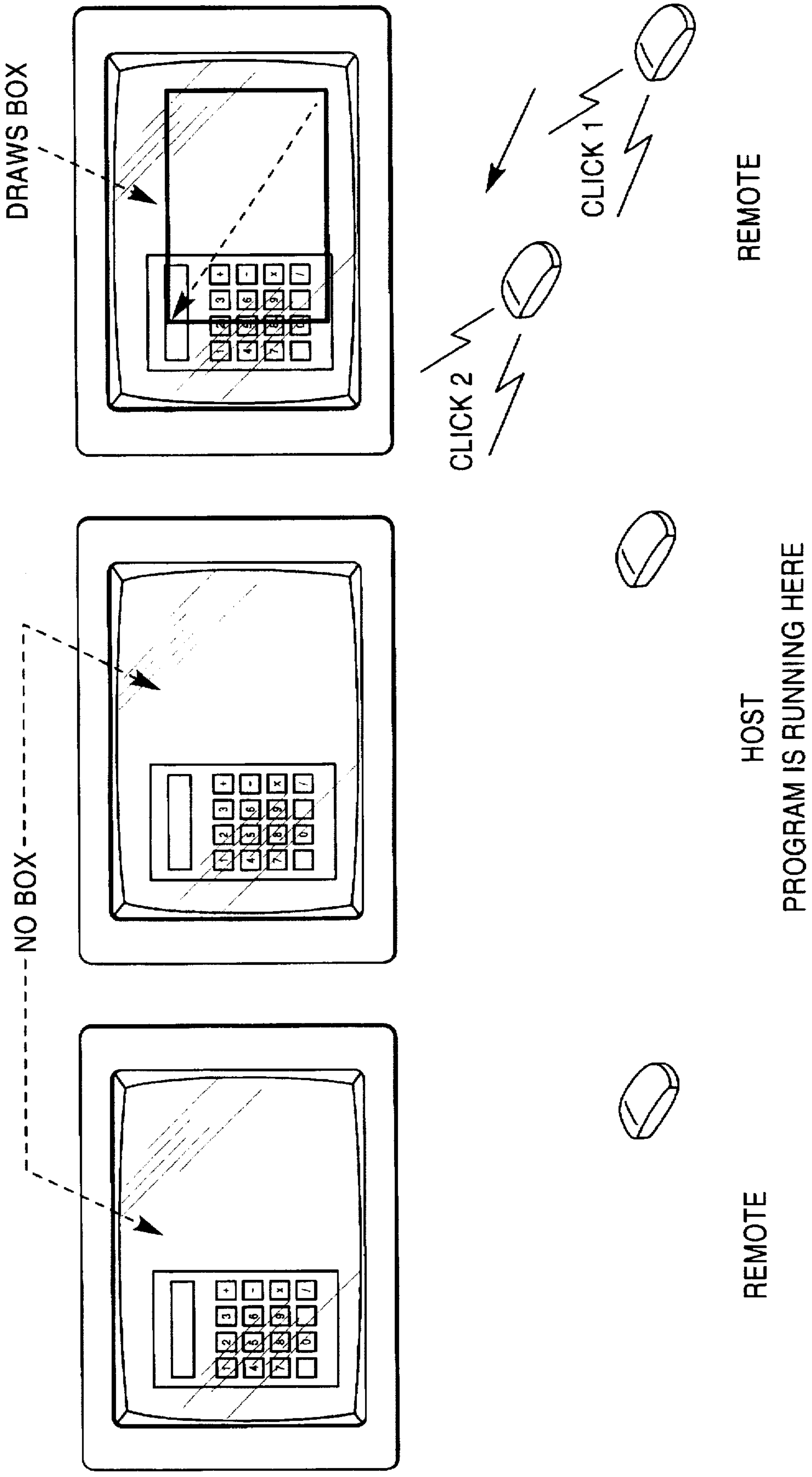
FIG. 13 illustrates how the invention responds when a remote user attempts to annotate the calculator, when the invention is in Local Annotation mode.
Figure 14:
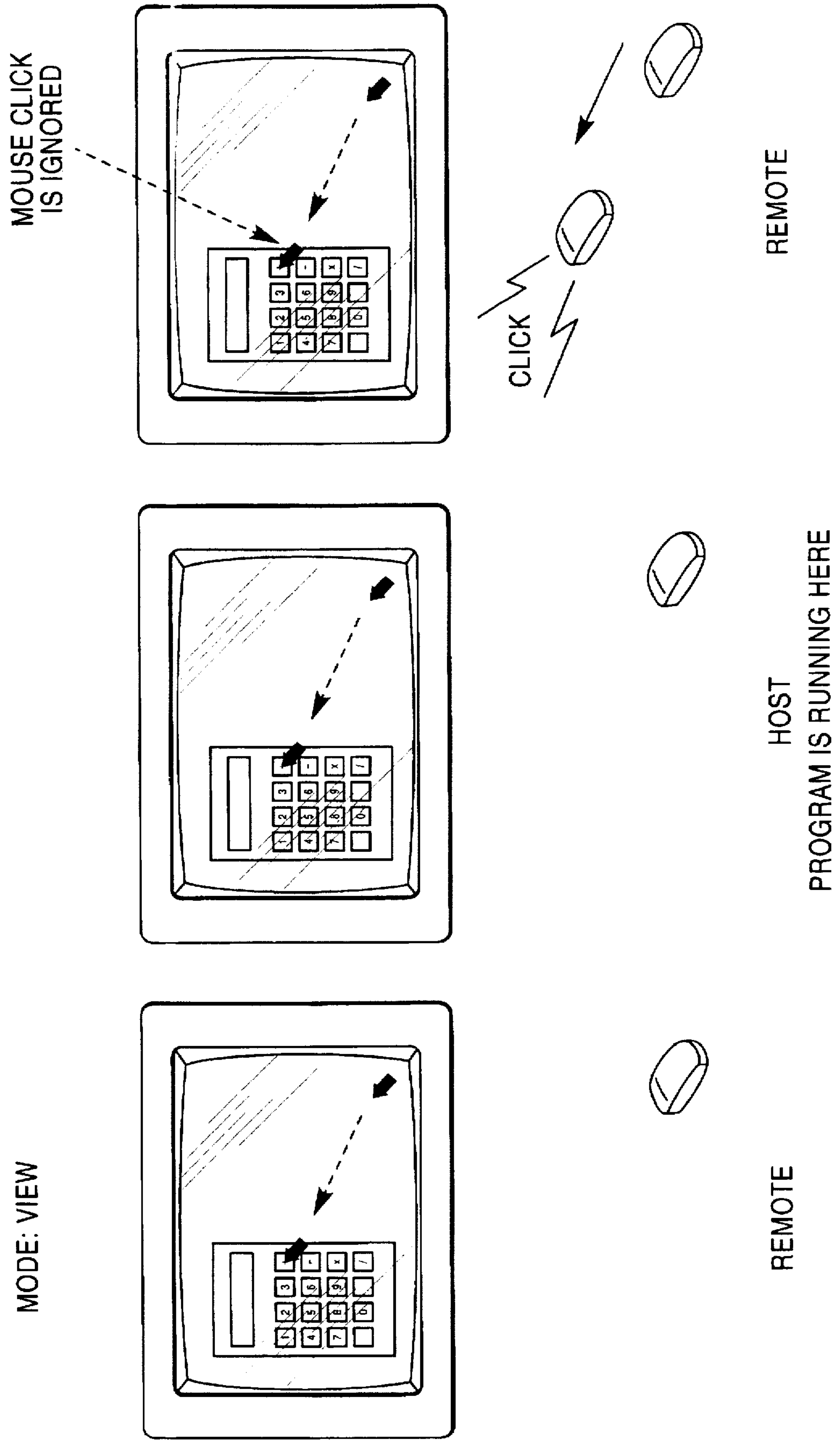
FIG. 14 illustrates how the invention responds to a remote user when in View mode.

Host Runs Application Program
Mode is "View"
User Input is at Host Computer
User Attempts to Operate Calculator As FIG. 8 indicates, the mouse click is ignored, and nothing happens at the Remotes.

In FIG. 15, the INPUT ROUTER reads the mouse message, but blocks it from APPLICATION, because the current mode is "view."

FIG. 9

Host Runs Application Program
Mode is "ANNOTATION"
User Input is at Remote Computer
User Attempts to Operate Calculator Assume that the user moves the mouse cursor over a calculator button and clicks the mouse. The mouse click is ignored. The other computers (Host and the other Remote) show the motion of the user's cursor, but nothing else, because no tool has been selected.

In FIG. 15A, the INPUT ROUTER blocks the mouse message from reaching APPLICATION. The logic is directed to ANNOTATION, which draws a cursor on the user's Remote display, via block GDI. ANNOTATION also sends data to CONNECTION API, which directs the logic to ANNOTATION in FIG. 15. This ANNOTATION represents the annotation logic present on the two other computers: the Host and the other Remote. These ANNOTATION blocks draw cursors corresponding to the users cursor, at corresponding positions, via the GDI block in FIG. 15, which represents GDI function calls.

The Host can use one tool, such as a box-drawing tool, while a Remote can use a different tool, such as a circle-drawing tool.

FIG. 10

Host Runs Application Program
Mode is "ANNOTATION"
User Input is at Remote Computer
User Attempts to Annotate Calculator Assume that the annotation is a box. A box is drawn on all displays. In FIG. 15A, the INPUT ROUTER at the user's Remote directs the mouse messages to the block ANNOTATION. ANNOTATION does two things. One, it calls the proper GDI functions to perform the annotation, namely, drawing the box.

Two, ANNOTATION sends annotation messages to CONNECTION API, which delivers the annotation messages to the other computers. However, one of these is the Host, and the other is a Remote. The logic at the Host reaches ANNOTATION in FIG. 15, and the logic at the other Remote reaches ANNOTATION in FIG. 15A.

Both of these ANNOTATION blocks cause the proper GDI functions to be called, to draw an annotation corresponding to the user's annotation. However, in the Host, logic path 5 is not taken at this time, because it is not necessary to replicate the Host's annotations at other computers.

FIG. 11

Host Runs Application Program
Mode is "APPLICATION"
User Input is at Remote Computer
User Attempts to Operate Calculator The reader is reminded that the calculator program is loaded only on the host, while a Remote user wishes to operate it.

The Remote user's INPUT ROUTER in FIG. 15A routes the mouse messages to CONNECTION API. The Host receives these messages, which are delivered to the Host's INPUT ROUTER in FIG. 15. The Host's INPUT ROUTER directs the messages to the block APPLICATION (ie, to the Application program, namely, the calculator program), which does two important things.

The calculator program treats the messages as though they were issued by the Host's mouse, even though a Remote mouse caused them. The calculator program responds in its usual way, which includes (1) showing a depressed calculator button "3", (2) writing the numeral "3" in the calculator's display, and (3) performing its own internal computations when it learns that the user entered data (namely, the "3").

However, before the calculator program can execute (1) and (2) in the previous paragraph, the Invention first captures the GDI functions which the calculator program calls. This capture is illustrated in block GDI CAPTURE in FIG. 15.

During this capture, the Invention, in effect, does two things. One, it sends these GDI functions to CONNECTION API (for the other computers to use). At the user's Remote, CONNECTION API in FIG. 15A directs the GDI functions to CAPTURED GDI DISPLAY, which replicates the Host's display. Two, it causes the GDI functions to be executed at the Host (via block GDI in FIG. 15). Therefore, the general sequence of events is the following:

The Remote user attempts to press a calculator button.

The invention running on the Remote detects this attempt, and sends data to the calculator program running on the host.

The data takes the form of messages, which the calculator program "thinks" come from the Host's mouse.

The calculator program performs as usual, and draws images on the Host display, via GDI calls.

The invention captures the GDI calls, and informs the Remotes of them.

The Remotes replicate the Host's window. The Remote user thus can remotely operate the calculator program running on the Host.

Summarizing in a different way: The invention generates mouse messages at the Host, based on mouse messages at the Remote. The calculator program (running on the Host) responds to the mouse messages as though they were generated at the Host. The invention intercepts the GDI calls made by the calculator program, and executes the same GDI calls at the Remote, thereby replicating the Host's display at the Remote.

FIG. 12

Host Runs Application Program
Mode is "Local Annotation"
User Input is at Remote Computer
User Attempts to Operate Calculator The user's mouse click is ignored. Nothing appears on the other displays in response to the mouse movement, because of failure to select a tool.

FIG. 13

Host Runs Application Program
Mode is "Local Annotation"
User Input is at Remote Computer
User Attempts to Annotate Calculator The annotation is drawn on the user's display, as indicated. No annotation occurs on the other displays.

FIG. 14

Host Runs Application Program
Mode is "View"
User Input is at Remote Computer
User Attempts to Operate Calculator As indicated, the mouse cursor moves at the user's display, but the mouse click is ignored. Further, the other two displays do not show the movement of the user's mouse cursor.

GENERAL CONSIDERATIONS

1. Different Programs Draw Different Parts of Overall Display. The displays are drawn using GDI functions. However, different parts of a display are drawn by different programs.

Despite the fact that all these drawing operations are undertaken using GDI functions, GDI functions are not the exclusive medium of communication between computers for replicating the displays.

Annotation Involves One Type of Data
Transfer Among Computers
Drawing by an Application Program
Involves Another Type.

For example, when a user performs annotation, the user's mouse messages are replicated, AS MESSAGES, at the other computers, via path 5 in FIG. 15. These replicated messages then cause the respective ANNOTATION blocks (at the other computers) to issue the proper GDI calls for drawing the annotation. That is, GDI calls are not sent directly from the user performing the annotation to the other computers.

In contrast, when an application program causes a graphic image to be drawn on a display, the invention intercepts GDI calls (via GDI CAPTURE in FIG. 15) and causes the GDI calls to be replicated on the other computers.

Reason for Difference

A major reason for the two different procedures (replicating mouse messages and replicating GDI calls) is that annotations are stored in memory at different locations than the display information.

That is, returning to the calculator of FIG. 2, the Application program stores the image of the calculator in the following general way. Annotation data is stored by the invention; Application program data is stored by the Application program (at the host). Each image of a key is stored as data from which a GDI function can draw the key. The data includes information such as position, size, color, and so on. Each key includes an associated number. The number can be stored as a text character, with information as to position, size, font type, and so on.

Annotation data is stored at a different location, but in the same general way.

If either the annotation or the Application program needs bitmaps, the bitmaps are stored in a conventional, known manner, by the GUI.

The invention combines the annotation images with the Application's images by the known technique of masking. That is, the invention, at a Remote, plays (or executes) the received GDI functions into a bitmap. The invention plays the received annotation information into a different bitmap. The two bitmaps are masked together.

The annotation data is kept separate from the application data so that, for example, a user can save an Application image, but without annotations. Alternately, a user can save annotation data alone, or save an annotated display.

As another example, keeping the annotation data separate facilitates drawing a display having no annotation data. If the annotation data were intermingled with the calculator image data, elimination of the annotation data would be difficult, if not impossible.

If GDI calls were transmitted exclusively (ie, no message replication were undertaken), then extra effort would be required to construct annotation data for separate storage.

2. GDI Interception, or Capture. GDI interception can be understood as follows.

A. On start-up, the invention replaces the first five bytes of each GDI function with a JUMP instruction to a particular program, namely, Trap.GDI.

B. Trap.GDI gets the parameters for the desired graphics image (eg, in the case of a box, the locations of the two diagonal corners) and calls the sub-program PkgDispCall. Trap.GDI also replaces the first five bytes.

C. PkgDispCall accepts the parameters from Trap.GDI and generates an object structure. This object structure is a block of data containing everything necessary for the other computers to draw the box.

For example, the object structure contains information as to size and position of the box. Further, the GUI draws images within a "context." The context includes things such as pen width, color, and other features. The invention tracks the contexts of the individual computers. If the context of the box drawn is different from the contexts of the remote computers, PkgDispCall includes data necessary for the other computers to create the correct contexts.

D. The object structure is shipped to the other computers, which then execute the same GDI functions.

E. The invention executes the original GDI functions.

3. Displays are not Transferred in Entirety. The displays are not replicated bit-by-bit. For example, the image of the calculator in FIG. 2 could be transferred between computers in bitwise fashion. If the calculator occupied a space of 200×300 pixels, then information regarding 60,000 (ie, 200×300) pixels must be sent.

Instead, the particular calculator image shown in FIG. 2 is treated as eighteen rectangles, plus a text character for each of sixteen of the rectangles, giving a total of 34 objects. Each object requires parameters, such as size and position. The number of parameters is small, in the range of three to ten. Assuming ten parameters, then 340 pieces of data must be sent. Of course, the size of each piece depends on many factors, but a small number of bytes for each piece may be assumed.

Therefore, the invention reduces the 60,000 pieces of data needed for bitwise replication to 340 pieces maximum for object replication. Of course, some objects may take the form of bitmaps, and must be sent bit-by-bit. However, in general, bitmaps are expected to be rare. Further, it is expected that, in general, bitmaps, when sent, need be send only once.

Further, the object data is compressed when possible. That is, every transmission between computers is of compressed data, when possible. Compression is known in the art.

4. Types of Data Link. Communication among computers can take several forms. Commercially available networks, local and wide area, can be used. Commercially available ISDN telephone service, provided by local telephone companies, can be used. Modem communication can be used.

5. Prior Art Message Detection. There are commercially available packages which detect messages generated by the GUI in response to an input device. One such package is WINSIGHT, available from Borland International. However, it is believed that such packages do not inform remote computers of the messages.

6. Alternate GDI Capture. An alternate approach to the graphics capture described above is the following. The system-provided GDI is replaced by a separate procedure which processes GDI calls before calling the actual system GDI. The system GDI name is changed to prevent confusion between the two modules. The same technique is also used on USR.EXE to also capture GDI calls made through system-provided modules.

7. More than One Computer can Run Application Programs. A given computer can act as a Host for one program and a Remote for another. For example, one computer can run a word processing program. Another computer can run a CAD drawing program. Each is Host for its respective program.

Since the invention's software on each computer is identical, or substantially identical, all users can run either the word processing program or the CAD program, in the manner described above.

8. "Real" Cursors and "Pseudo" Cursors. There are two types of "cursor." Each GUI generates its own "real" cursor. The real cursor is not generated by GDI functions, but by an independent function in the GUI. The reader can view the cursor as a bitmap which the GUI moves in response to mouse motion.

In addition to the real cursor, which is controlled by the local mouse, the invention generates a "pseudo" cursor for each remote participant. The pseudo cursors are generated using GDI functions.

Sometimes a real cursor changes shape as the cursor moves. For example, it can take the form of an arrow when lying on a tool bar, and then change to a hand when lying on a client area. Sometimes this change is under the control of the Application program.

Therefore, if a Remote user is controlling an Application program running on a Host machine (as in FIG. 11), the Application program may change the cursor on the Host machine, but without using GDI calls. Consequently, the GDI capture of FIGS. 15 and 15A will be ineffective to replicate the changed on the Remote display.

To confront this problem, the invention watches for the functions which change the real cursor (eg, the SetCursor command). The invention replicates the cursor change on the Remote computer.

One way is to execute the same SetCursor command. An alternate approach would be to change the Remote cursor by executing a proper sequence of GDI calls, or to draw a bitmap, when the Host cursor changes.

9. Entire Display not Replicated. The invention only replicates windows which the user of a display identifies. That is, the user can keep a workspace, such as a notepad, private during a conference. GDI calls use a task handle. If the task handle does not refer to a shared item, the GDI calls are not shared.

10. All Parameters of GDI Calls not Always Shared. This aspect of the invention is perhaps best illustrated by an example, based on the following Background.

BACKGROUND

When a GDI call is issued, two main features become involved, namely "device contexts" and "objects." Device contexts will be considered first.

Device Contexts

If you draw a rectangle on a blackboard, the rectangle would consist of white lines, of a certain width, on a black background. This situation illustrates a type of "device context," namely, white lines, of given width, on a black background. Any image drawn on the blackboard (using the same chalk) would conform to this device context.

When you use the GUI to draw a rectangle on an output device of the computer, such as a video display, printer, or plotter, a similar idea applies. You specify, either explicitly, or by default, a device context for your rectangle.

The device contexts used by the GUI include the following parameters:

the color of the rectangle, the color of the background, the thickness of the four lines which compose the rectangle, the dimensions and location of the window containing the rectangle, and other data.

(The GUI of the preferred embodiment uses device contexts which contain about nineteen different parameters.)

Objects

A similar concept applies to objects. When you issue the GDI call to draw the rectangle, you select a "pen." The pen is not a physical pen, but a collection of parameters which describe the line which is to be drawn. The pen's parameters are line width, color, and style of dashing (eg, solid line, dotted line, center line, etc.) These parameters are stored by the computer, and are used when the pen is called into action.

Thus, the GUI obtains its drawing instructions from multiple sources. In the example under consideration, there are three sources:

(1) The GDI call, which specifies the type of image (a rectangle), and other parameters, such as size and location;

(2) The device context, which is specified by the GDI call (or by default); and (3) The objects involved, which are also specified by the GDI call (or by default).

When the invention relays the GDI calls to remote computers, the remote computers must be informed of the relevant device contexts and objects. The invention condenses the way in this information is transmitted, in order to conserve bandwidth.

EXAMPLE

Assume that (1) a remote conferencing session has just begun, (2) an application is being shared, (3) no GDI calls have been previously issued, (4) no device contexts or pens have been modified from their default status, (4) the shared application appears in a window named APP_WINDOW, and (5) a user, located at the Host computer, wishes to draw a circle on "APP_WINDOW".

When the annotator draws the circle, using a mouse, the invention receives the mouse messages and issues the proper GDI calls in response, as described above. The GDI calls make reference, either explicitly or by default, to both a device context and a pen, enabling the GUI to draw the circle. Since, by stipulation, no changes have been made to the default values of the device context and pen, the default values are used by the GUI in drawing the circle.

The invention intercepts the GDI calls en route to the GUI and, because the application is being shared, notifies the remote computers of the circle drawn. The invention must tell the remote computers (a) the identity of the GDI call, together with (b) a device context and (c) a pen, together with other data not relevant to the present discussion.

Since no changes have been made to the default values of the device context and the pen, the invention, in effect, transmits a message which tells the remote computers to use both the default device context, and the default pen. The invention does not transmit the entire default device context, nor the default pen.

FURTHER EXAMPLE

Assume that the annotator changes either the device context or the pen. For example, the annotator may change the color of the background (thereby changing the device context), or may change the line width of the pen (thereby changing the parameters of the pen.)

The invention does not transmit the entire device context, nor the entire collection of pen parameters, to the remote computers. Instead, the invention transmits only the changes.

Further, the invention transmits the changes only when a GDI call is issued which makes reference to the changed device context or changed pen. An example will illustrate a situation where this delay becomes important.

ANOTHER EXAMPLE

Assume that, during a remote conferencing session, in preparation for making an annotation, an annotator changes the background color of a window, thereby changing the device context of the window. Assume that, immediately after the change, an announcement is made by a conference participant, which seizes the annotator's attention, and interrupts the impending annotation about to be made.

The invention does not transmit the change in the device context at this time, for two primary reasons. First, there is no present need, because no GDI calls which require the device context have been issued. Second, the transmission will occupy bandwidth which could better be used for other transactions. In this example, the announcement may signal the start of intense data transmission.

Rather, the invention waits until the annotator causes a GDI call to be issued which uses the changed device context. Then, at this time, the invention relays the change to the remotes. However, to repeat, the entire device context is not transmitted at this time; only the change.

YET FURTHER EXAMPLE

The remote computers store both the device contexts and objects relevant to the GDI calls. When the remote computers receive changes, the remotes modify the stored device contexts and objects accordingly. Thus, the remote computers maintain device contexts and objects which correspond to identical device contexts and objects stored in the host computer. The host, together with the remotes, update the device contexts and objects as necessary. If no updates are made, the device contexts and objects maintain their default values.

REMOTES DRAW USING HOST'S GDI, BUT REMOTE'S DEVICE CONTEXT

When the host computer sends a GDI call to the remotes, the remote computers use the information already contained in their own, corresponding, device contexts and objects, to draw the image required by the GDI call. That is, the host does not transmit the entire device context required for a given call, nor an entire object.

This aspect of the invention can be particularly significant when a remote computer joins a conference which is already in progress. The host computer has maintained the current status of the device contexts and objects in use. However, the newly joining remote computer does not know of the current status.

Nevertheless, the invention transmits information to the remote from which the remote can construct the device contexts and objects. This information, in effect, is the changes which have occurred. The remote, based on the known, default, content, plus the changes, constructs the device contexts and objects.

The preceding discussion considered annotation. However, the invention issues GDI calls, and transmits them to remote computers, without annotation occurring. In these instances, the invention still operates as described: the remotes maintain device contexts and objects, based on changes received from the host.

DEFINITIONS

A "device context" can be defined as a changeable collection of data which specifies the background against which an image is drawn. An exemplary collection of such data is given in the Table spanning pages 514 and 515 of Petzold's textbook, identified above.

The approach of maintaining device contexts in the remote computers, based on changes in the host's device contexts, yet without transmitting the entire device contexts themselves, can be referred to as "non-redundant" maintenance.

That is, assume that a host's device context contained nineteen parameters, and that a single parameter changed. It would be redundant to transmit all nineteen parameters to a remote after the change: the remote would already know the values of eighteen of the parameters.

NOTE

In the preferred embodiment, when changes are made to objects, such as pens, the entire object is transmitted to the other computers, rather than only the changes themselves. The reason is that the entire objects tend to occupy small data spaces.

11. Computer Code. Computer code in microfiche form is attached. A description of files contained therein is contained in the following Table. A description of some of the files referenced in the preceding discussion may be contained in the parent application.

TABLE

| | |
|---|---|
| | Playback Side (Remote): |
| dibddb.c | Functions responsible for the translations of Device Independent Bitmaps to a Device Dependent format that the GDI Playback machine (the remote) understands |
| gdiobjpy.c | Functions responsible for the creation of GDI objects from object description data that is transmitted from the host machine |
| globals.c | Primary global variable header file |
| globals.h | Secondary global variable header file |
| linklist.c | Functions responsible for the creation and maintenance of the linked lists required for the playback of the GDI calls |
| proto.h | Prototypes for all GDI Playback calls |
| tmplay.c | Code responsible for all exported functions<br>Functions which recreate all GDI calls from the call description data |
| tmplay.h | GDI Playback include file which contains the prototypes for our exported API |
| tmplayp.h | Private structures required for GDI Playback |
| tmplay.def | Module definition file used to create the tmplay executable file |
| | Capture Side (Host): |
| cache.c | Functions which discern whether an object has to be re-transmitted to the remote machine, or whether the currently cached copy can be used |
| dibddb.c | Functions which change all Device Dependent bitmaps to Device Independent bitmaps to guarantee device independence for GDI Capture |
| gdiobjcp.c | Functions for retrieving GDI objects out of the GDI default data heap |
| globals.c | Primary global variable header file |
| globals.h | Secondary global variable header file |
| intercpt.asm | Functions which hook the GDI and Windows calls that must be intercepted |
| linklist.c | Functions to create and maintain the various linked lists used for identifying tasks, objects, Device Contexts, etc. |
| package.c | Functions to queue up GDI Capture remote data packets for efficient utilization of the connection medium |
| proto.h | Prototypes for all GDI Capture calls |
| remote.c | Functions responsible for generating non-graphic remote machine manipulations |
| tmcapt.c | Functions responsible for all exported functions, as well as the state tracking of the window positions |
| tmcapt.h | GDI Capture include file which contains the prototypes for our exported API |
| tmcaptp.h | Private structures required for GDI Capture |
| trap.c | Function which parse the calls that we are intercepting |
| tmcapt.def | Module definition file used to create the tmcapt executable file |

TABLE-continued

| | |
|---|---|
| | Include Files Common to both Playback and Capture: |
| gdiobj.h | This file contains the data descriptions for the GDI objects |
| pkgtags.h | This file contains the data descriptions for the transmissions id's of the intercepted calls |
| udwgdi.h | This file contains some unimportant data structures not documented in standard windows documentation |
| makefile | File used to build sources to obtain executable object code |

Numerous substitutions and modifications can be undertaken without departing from the true spirit and scope of the invention. What is desired to be secured by Letters Patent is the Invention as defined in the following claims.

We claim:

1. In a system wherein a GUI runs on a host computer and generates graphic images by issuing GDI calls which make reference to device contexts, the improvement comprising:

a) maintaining similar device contexts in remote computers and b) maintaining substantially identical first program means on each computer, which i) allows a single application program to selectively run on any of the computers, and no other computer, which generates a display on the selected computers, ii) replicates the display on all other computers, iii) allows a user of each computer to make annotations, containing graphical images, on the replicated display of each respective computer, iv) allows each respective user to selectively A) cause the first program means to copy the annotations made by the user to replicated displays of other computers, or B) cause the first program means to refrain from copying the annotations made by the user.

2. An improvement according to claim 1 and further comprising the step of transmitting changes in the host's device contexts to the remote computers, without redundancy.

3. An improvement according to claim 2 and further comprising the step of transmitting the changes only after a GDI call was issued which requires a changed device context.

4. System according to claim 1, and further comprising:

c) informing a new remote computer, which connects with the host and said remote computers while said application program is running, of the current status of the device contexts.

5. A system comprising a) multiple computers which use data records identified as device contexts, together with other data, to generate drawings;

b) means for maintaining common contents in corresponding device contexts in different computers; and c) a first program means, running on each computer, for i) allowing an application program, different from the first program means, to run on any one of the computers, and no other;

ii) copying displayed output of the application program to displays of all other computers;

iii) allowing a user of every computer to apply annotations, which contain text and graphical images, to the copied display output of the user's computer; and iv) allowing each respective user to selectively A) cause the first program means to copy the annotations made by the user to copied displayed output of other computers, or B) cause the first program means to refrain from copying the annotations made by the user.

6. A system according to claim 5 in which the means for maintaining c) detects changes in a predetermined device context; and d) notifies other computers of the changes.

7. A system according to claim 6 in which the notification is done without transmitting redundant data.

8. System according to claim 5, and further comprising:

c) means for informing a computer, which connects with the multiple computers while said application program is running, of the current status of the device contexts.

* * * * *